UNITED STATES PATENT OFFICE 2,601,498

OIL SOLUBLE FURFURAL-PHENOL RESINS

Lloyd H. Brown, Chicago, Ill., assignor to The Quaker Oats Company, Chicago, Ill., a corporation of New Jersey No Drawing. Application June 22, 1950,
Serial No. 169,769

5 Claims. (Cl. 260—56)

This invention relates to synthetic resins prepared from furfural and phenol and to methods and steps of making same.

It is well known in the art that resins can be made from furfural and phenol, which have the properties of durability and resistance to water, acids, and other corrosive and destructive influences which make them desirable for coating compositions. Heretofore, however, the resins prepared according to the methods described in the prior art are not suitable as such for coating compositions because they are incompatible with vegetable oils. Recognizing the desirability of an oil soluble furfural-phenol vegetable resin, several methods have been suggested to make them compatible with vegetable oils. One proposed method attains that objective by fusing furfural-phenol resin with rosin but the use of this method is limited because the presence of rosin detracts from the desirable properties of the resin in direct proportion to the relative amount of rosin present. Two other methods suggested for the preparation of oil soluble furfural-phenol resins make use of substituted phenols mainly para substituted phenols or phenolic bodies containing two or more benzene rings. These latter methods, while they do produce oil soluble resins, are undesirable economically, since these substituted and multiple ring phenolic bodies are relatively expensive.

In accordance with the present invention, resins soluble in vegetable oils such as tung oil, linseed oil, rapeseed oil, castor oil and similar oils, are formed by heating furfural and an excess of phenol in the presence of a basic catalyst followed by neutralization and dehydration under a vacuum to remove unreacted phenol, solvent and any water which may be present. These new resins are useful for impregnating and laminating purposes and being compatible with vegetable oils are useful in the preparation of solutions for protective coatings and varnishes. I have discovered that the solubility or compatibility of furfural-phenol resinous products in vegetable oil depends upon the ratio of furfural to phenol used in their preparation. The molar ratio of phenol to furfural used must be greater than 2 to 1—preferably about 4 or more to 1. Products formed by reacting furfural with an excess of phenol in accordance with the methods hereinafter to be described are characterized by being readily soluble or compatible with vegetable oils without the addition of a solubilizing agent or other treatment.

Briefly, in carrying out the present invention, furfural and an excess of phenol are heated in the presence of a basic catalyst at a temperature of about 80° to 160° C. preferably 100° to 120° C. until the composition of the resulting resin varies between about 0.5 to 0.7 mole of furfural per mole of phenol. As a convenient method of obtaining a resin of that composition, I prefer to use about 1 mole of furfural per 4 moles of phenol as the initial ratio of those reactants. Generally, in respect to time, I have found that a heating period of 1 to 2 hours is sufficient to effect the desired degree of resinification.

As a preferred embodiment of my invention, I may employ a solvent such as benzene, toluene, or even an aliphatic hydrocarbon boiling within the range of about 80° to 150° C. These solvents not only provide a convenient method of controlling the reaction but in addition, provide a method of measuring the extent of the reaction. This latter result follows from the fact that since one mole of water is formed per mole of furfural reacting, a method for determining the amount of water formed during the reaction is a measure of the extent of the reaction. The reaction product so formed is a viscous liquid which after neutralization by the addition of an acid to a pH of about 5–7 and distillation under a vacuum to remove unreacted phenol, solvent, and water yields a fusible and oil soluble resin. Since an excess of phenol is used in the process, the excess phenol must be recovered for efficient operation. The yields of the oil soluble resins obtainable by the process of this invention based upon the amount of phenol consumed in the process are practically quantitative.

In the manufacture of oil varnishes from the resinous bodies to which this invention is directed, the methods and proportions generally used may be followed. The resinous product is dissolved in the fatty oil by heating and the heating continued until the desired viscosity or "body" is obtained. Suitable solvents, such as petroleum thinner, turpentine and other solvents commonly used in varnish, and driers if desired are then added and after cooling the varnish so formed is ready for use. Varnishes prepared in this manner are fast drying to a non-tacky condition. This property of rapid drying in conjunction with the properties of flexibility, toughness, adhesiveness, and resistance to acids, alkalies, water and weather conditions particularly adapt them for use as protective coatings such as for table tops, reacting vessels, wire, structural steel and similar materials.

The following examples are given to illustrate the present invention. Parts given are parts by weight.

Example 1

Phenol (376.4 parts) and sodium hydroxide (7.53 parts) were added to a reaction vessel equipped with a stirrer, thermometer, condenser and Bidwell trap. After dissolving the sodium hydroxide in the phenol by heating the mixture to 160° C. with stirring, the resulting solution was cooled to about 100° C. and 120 parts of benzene added. The solution was then refluxed at 120° C. the condensate returning to the reaction vessel by way of the Bidwell trap until all the water was removed. About 3 parts of water was removed by this operation. 96.1 parts of furfural was then added and the system was refluxed at 120° C. for a period of 1½ hours as before during which operation 18 parts of water was collected in the Bidwell trap. The mixture was then neutralized by the addition of about 60 parts of a 10 per cent hydrochloric acid solution which gave a pH of about 6-7 determined by triturating a small sample of the resin with an equal volume of water for 5 minutes and then measuring the pH of the aqueous layer with pH indicator paper (Hydrion). After standing about 1 hour and decanting the water layer, the mixture was subjected to vacuum distillation for 2¼ hours at a pressure of 7-10 mm. and a temperature of 150° C. which removed excess phenol, water and benzene. Two hundred twenty-five parts of a dark brown brittle resin was obtained which was soluble in aromatic hydrocarbons, tung oil, linseed oil, rapeseed oil, perilla oil, soy bean oil, China-wood oil and caster oil.

*Example 2*

Phenol (2702 parts) and sodium hydroxide (54 parts) were added to a reaction vessel similar to that used in Example 1. After dissolving the sodium hydroxide in the phenol by heating the mixture to 160° C. with stirring, the resulting solution was cooled to about 115° C. and then 552 parts of furfural was added to it over a period of about 30 minutes. The solution was then heated to about 120° C. and held at that temperature for a period of 2 hours after which the pH was adjusted to a value of 5.5 by the addition of 420 parts by volume of 3 normal hydrochloric acid to it. The mixture was subjected to vacuum distillation for 3⅔ hours at a pressure of 7 mm. and a temperature of 145° C. which removed excess phenol and water. 1370 parts of brittle, oil soluble resin was obtained on cooling which was soluble in aromatic hydrocarbons, tung oil, linseed oil, rapeseed oil and caster oil.

*Example 3*

To 40 parts of tung oil which had been heated to 100° C. is added 20 parts of the resin of Example 1 with stirring. After all the resin had gone into solution, the resulting solution was heated to a temperature of 225° C. for a period of about 20 minutes to give a product of the desired viscosity or "body." Since the resulting liquid is too viscous for viscosity determinations by means of a viscosimeter, I resort to the so-called "string" method for those measurements. In this method a portion of the resin solution is placed upon a cool plate, the surface of the resin touched with the finger, and then upon withdrawing the finger vertically a "string" of resin is formed and the more viscous the resin the greater the length of the string before it broke. Following the foregoing procedure the resin-tung oil solution heated as above gave a 6 inch "string."

To prepare a varnish, approximately 85 parts of a solution consisting of 3 parts toluene and 1 part naphtha, together with 1 part lead naphthenate and 0.4 part each of manganese and cobalt naphthenates as driers were added to the resin tung oil solution. The resulting amber colored varnish so obtained is characterized by rapid drying and excellent resistance to acids, alkalies, moisture and other destructive influence alkalies, moisture and other destructive influences.

It is to be understood that the foregoing details are given merely by way of illustration and that many variations may be made therein without departing from the spirit or scope of the invention. As for example, instead of sodium hydroxide I may use other basic catalysts such as potassium hydroxide, barium hydroxide, lime, sodium carbonate or potassium carbonate with equal results. Likewise, other acids including both mineral and organic acids may be used for neutralizing the mixture.

Having thus set forth the nature of my invention, what I claim is:

1. The method for producing an oil soluble resin which comprises heating a mixture consisting of furfural and phenol in the approximate molar ratio of 1 to 4 in the presence of a basic catalyst until a viscous resin is obtained, adjusting the pH of the mixture to a value of about 5 to 7 by the addition of an acid thereto and then removing the excess phenol and water therefrom.

2. The method for producing an oil soluble resin which comprises heating a mixture consisting of furfural and phenol in the approximate ratio of 1 to 4 in the presence of a basic catalyst until a viscous liquid is obtained, adding acid thereto until said mixture is slightly acid and then removing the excess phenol and water therefrom.

3. The method for producing an oil soluble resin which comprises heating a mixture consisting of furfural and phenol in the approximate ratio of 1 to 4 in the presence of sodium hydroxide until a viscous resin is obtained, adjusting the pH of the mixture to a value of about 5 to 7 by the addition of an acid thereto and then removing the excess phenol and water therefrom.

4. The method for producing an oil soluble resin which comprises heating a mixture consisting of furfural and phenol in the approximate ratio of 1 to 4 in the presence of sodium hydroxide until a viscous liquid is obtained, adjusting the pH of the mixture to a value of about 5 to 7 by the addition of an acid thereto and then removing the excess phenol and water therefrom.

5. The method for producing an oil soluble resin which comprises heating a mixture consisting of furfural and phenol in the approximate molar ratio of 1 to 4 in the presence of an organic solvent and a basic catalyst until a viscous resin is obtained, adjusting the pH of the mixture to a value of about 5 to 7 by the addition of an acid thereto and then removing the excess phenol, solvent and water therefrom.

LLOYD H. BROWN.

REFERENCES CITED

The following references are of record in the file of this patent:

UNITED STATES PATENTS

| Number | Name | Date |
| --- | --- | --- |
| 1,771,033 | Ellis | July 22, 1930 |
| 1,841,138 | Mains | Jan. 12, 1932 |